United States Patent
Weyerhaeuser et al.

(10) Patent No.: US 10,114,825 B2
(45) Date of Patent: Oct. 30, 2018

(54) DYNAMIC RESOURCE-BASED PARALLELIZATION IN DISTRIBUTED QUERY EXECUTION FRAMEWORKS

(71) Applicants: Christoph Weyerhaeuser, Heidelberg (DE); Tobias Mindnich, Sulzbach (DE); Johannes Merx, Heidelberg (DE); Joerg Schad, Leimen (DE); Julian Schwing, Mannheim (DE)

(72) Inventors: Christoph Weyerhaeuser, Heidelberg (DE); Tobias Mindnich, Sulzbach (DE); Johannes Merx, Heidelberg (DE); Joerg Schad, Leimen (DE); Julian Schwing, Mannheim (DE)

(73) Assignee: SAP SE, Walldorf (DE)

( * ) Notice: Subject to any disclaimer, the term of this patent is extended or adjusted under 35 U.S.C. 154(b) by 573 days.

(21) Appl. No.: 14/212,163

(22) Filed: Mar. 14, 2014

(65) Prior Publication Data
US 2015/0261765 A1 Sep. 17, 2015

(51) Int. Cl.
*G06F 7/00* (2006.01)
*G06F 17/30* (2006.01)

(52) U.S. Cl.
CPC .............................. *G06F 17/30067* (2013.01)

(58) Field of Classification Search
CPC ......... G06F 17/30463; G06F 17/30424; G06F 17/30433; G06F 17/30445; G06F 17/30466; G06F 17/30477; G06F 17/30539; G06F 17/30699; G06F 17/30333; G06F 17/30545; G06F 17/30483; G06F 17/3051; G06F 9/3885; G06F 9/4843; G06Q 10/0633

USPC ................. 707/752, 810, 763–764, 718, 792
See application file for complete search history.

(56) References Cited

U.S. PATENT DOCUMENTS

| | | | | |
|---|---|---|---|---|
| 7,493,515 | B2* | 2/2009 | Armstrong | G06F 9/4856 714/10 |
| 8,122,010 | B2* | 2/2012 | Barsness | G06F 9/50 707/718 |
| 8,601,474 | B2* | 12/2013 | Konik | G06F 9/455 707/718 |
| 8,775,413 | B2* | 7/2014 | Brown | G06F 17/30474 707/713 |
| 8,924,974 | B1* | 12/2014 | Ruggiero | G06F 9/466 707/643 |
| 9,015,812 | B2* | 4/2015 | Plattner | G06F 21/6245 713/154 |
| 2002/0147670 | A1* | 10/2002 | Lange | G06Q 30/08 705/35 |
| 2006/0136923 | A1* | 6/2006 | Kahn | G06F 9/468 718/100 |
| 2007/0030278 | A1* | 2/2007 | Prokopenko | G06F 9/5044 345/506 |
| 2007/0030279 | A1* | 2/2007 | Paltashev | G06F 9/3836 345/506 |

(Continued)

*Primary Examiner* — Tony Mahmoudi
*Assistant Examiner* — Linh Black
(74) *Attorney, Agent, or Firm* — Mintz Levin Cohn Ferris Glovsky and Popeo, P.C.

(57) ABSTRACT

As part of query processing within a distributed execution environment framework, available resources taken into account when generating an execution plan and/or executing an execution plan to determine whether to parallelize any operations. Related apparatus, systems, methods and articles are also described.

20 Claims, 4 Drawing Sheets

(56) References Cited

U.S. PATENT DOCUMENTS

| | | | | |
|---|---|---|---|---|
| 2007/0030280 A1* | 2/2007 | Paltashev | G06T 1/20 | |
| | | | 345/506 | |
| 2012/0109934 A1* | 5/2012 | Weyerhaeuser | G06F 17/30463 | |
| | | | 707/713 | |
| 2012/0110583 A1* | 5/2012 | Balko | G06F 9/4843 | |
| | | | 718/102 | |
| 2012/0159459 A1* | 6/2012 | Turner | G06F 8/314 | |
| | | | 717/138 | |
| 2013/0173569 A1* | 7/2013 | Pearcy | G06F 17/30 | |
| | | | 707/706 | |
| 2013/0212086 A1* | 8/2013 | Burger | G06F 17/30433 | |
| | | | 707/718 | |
| 2013/0243329 A1* | 9/2013 | Oro Garcia | G06K 9/00973 | |
| | | | 382/195 | |
| 2013/0346234 A1* | 12/2013 | Hendrick | G06Q 30/0631 | |
| | | | 705/26.7 | |
| 2013/0346425 A1* | 12/2013 | Bruestle | G06F 17/30345 | |
| | | | 707/752 | |
| 2014/0046921 A1* | 2/2014 | Bau | G06F 17/30864 | |
| | | | 707/706 | |
| 2015/0007187 A1* | 1/2015 | Shows | G06F 9/5088 | |
| | | | 718/104 | |

* cited by examiner

DYNAMIC RESOURCE-BASED PARALLELIZATION IN DISTRIBUTED QUERY EXECUTION FRAMEWORKS

TECHNICAL FIELD

The subject matter described herein relates to query handling within a distributed query execution framework, such as those employing calculation engines, that dynamically parallelizes aspects of the query based on available resources.

BACKGROUND

Distributed query execution frameworks, such as a calculation engine executing calculation scenarios, are increasingly being adopted. Calculation scenarios offer the possibility to integrate custom operators such as C++ operators that are compiled with database binaries and also script based (LLVM) operators which, in turn, can be easily created and integrated by customers without any changes to the database binaries. From the calculation engine perspective, these operators can be handled as black boxes, that is, only the interface is known meaning the number and data types of the input columns and the number and data type of the output columns.

With some conventional arrangements, native calculation engine operators are generally set-based; however, some algorithms require the possibility to loop over several rows which is possible with script based operators. Row-wise looping on the other hand can be resource expensive for big data sizes and thus often can harm overall query performance. One approach to overcome such performance impacts implement highly parallelized algorithms which can be applied on separated chunks of data.

Distributed query execution frameworks employing calculation engines only offer static (i.e., pre-defined) query splits. This arrangement requires that the creator of the calculation scenario knows in advance how many parallel threads should be used during execution. At the time of execution, this static split criterion (as defined in a calculation scenario) is applied, independently from the system load and the available resources.

Static query splits become especially problematic when long running calculation scenarios are used for batch-based processing in which the response time and the duration of the query is irrelevant. For long running batch processes, it is important to not decrease the system performance for other concurrent queries which are triggered by end users. If such a long running query uses a static split, the query processing can often occupy a large share of the CPU performance in the system. During this time, other queries may starve due to lack of resources or at least suffer from bad response times from the end user perspective.

SUMMARY

In a first aspect, a query is received by a database server from a remote application server. The query is associated with a calculation scenario that defines a data flow model that includes one or more calculation nodes that each define one or more operations to execute by a calculation engine on the database server. At least one of the nodes comprising a dynamic split operator. Thereafter, the database server instantiates a runtime model of the calculation scenario. An execution plan of the runtime model of the calculation model is then built based on operations defined by the calculation nodes of the instantiated scenario and based on fetched data characterizing available database resources. The available database resources are used to determine whether to split one or more operations specified by the dynamic split operator into two or more parallel processor threads. Subsequently, the database server executes the operations defined by the execution plan so that the data set can be provided to the application server.

In an interrelated aspect, a query is received by a database server from a remote application server. The query is associated with a calculation scenario that defines a data flow model that includes one or more calculation nodes that each define one or more operations to execute by a calculation engine on the database server. At least one of the nodes comprising a dynamic split operator. Thereafter, the database server instantiates a runtime model of the calculation scenario. An execution plan of the runtime model of the calculation model is then built based on operations defined by the calculation nodes of the instantiated scenario. The database server then executes the operations defined by the execution plan and based on fetched data characterizing available database resources to determine whether to parallelize any of the operations and to obtain a data set. The database server can then provide the data set to the application server.

In still a further interrelated aspect, a query is received by a database server from a remote application server. The query is associated with a calculation scenario that defines a data flow model that includes one or more calculation nodes that each define one or more operations to execute by a calculation engine on the database server. At least one of the nodes comprising a dynamic split operator. Thereafter, the database server instantiates a runtime model of the calculation scenario. An execution plan of the runtime model of the calculation model is then built based on operations defined by the calculation nodes of the instantiated scenario. The database server then executes the operations defined by the execution plan to obtain a data set. The database server can then provide the data set to the application server. With this variation, at least one of the building of the execution plan and the execution of the execution plan is based on fetched data characterizing available database resources to determine whether to parallelize any of the operations.

At least a portion of paths and/or attributes defined by the calculation scenario can, in some implementations, not be required to respond to the query. In such cases, the instantiated calculation scenario can omit the paths and attributes defined by the calculation scenario that are not required to respond to the query.

At least one of the calculation nodes can filter results obtained from the database server. At least one of the calculation nodes can sort results obtained from the database server.

The calculation scenario can be instantiated in a calculation engine layer by a calculation engine. The calculation engine layer can interact with a physical table pool and a logical layer. The physical table pool can include physical tables containing data to be queried, and the logical layer can define a logical metamodel joining at least a portion of the physical tables in the physical table pool. The calculation engine can invoke an SQL processor for executing set operations.

An input for each calculation node can include one or more of: a physical index, a join index, an OLAP index, and another calculation node. Some or all calculation nodes can have at least one output table that is used to generate the data set. At least one calculation node can consume an output table of another calculation node.

The query can be forwarded to a calculation node in the calculation scenario that is identified as a default node if the query does not specify a calculation node at which the query should be executed. The calculation scenario can include database metadata.

The database can be a column oriented database. The database can be an in-memory database.

Computer program products are also described that comprise non-transitory computer readable media storing instructions, which when executed by one or more data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, peer-to-peer wireless coupling, a local area network, a wide area network, a wired network, or the like), via a direct connection between one or more of the multiple computing systems, etc.

The subject matter described herein provides many advantages. For example, the current subject matter allows for distributed query execution framework to dynamically parallelize aspects of a calculation scenario based on system load to avoid situations in which certain queries consume too many or all CPU resources. In particular, with the current subject matter, if maximum performance is not relevant for a query, the resources are kept free for other queries which require greater processing resources.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1A:
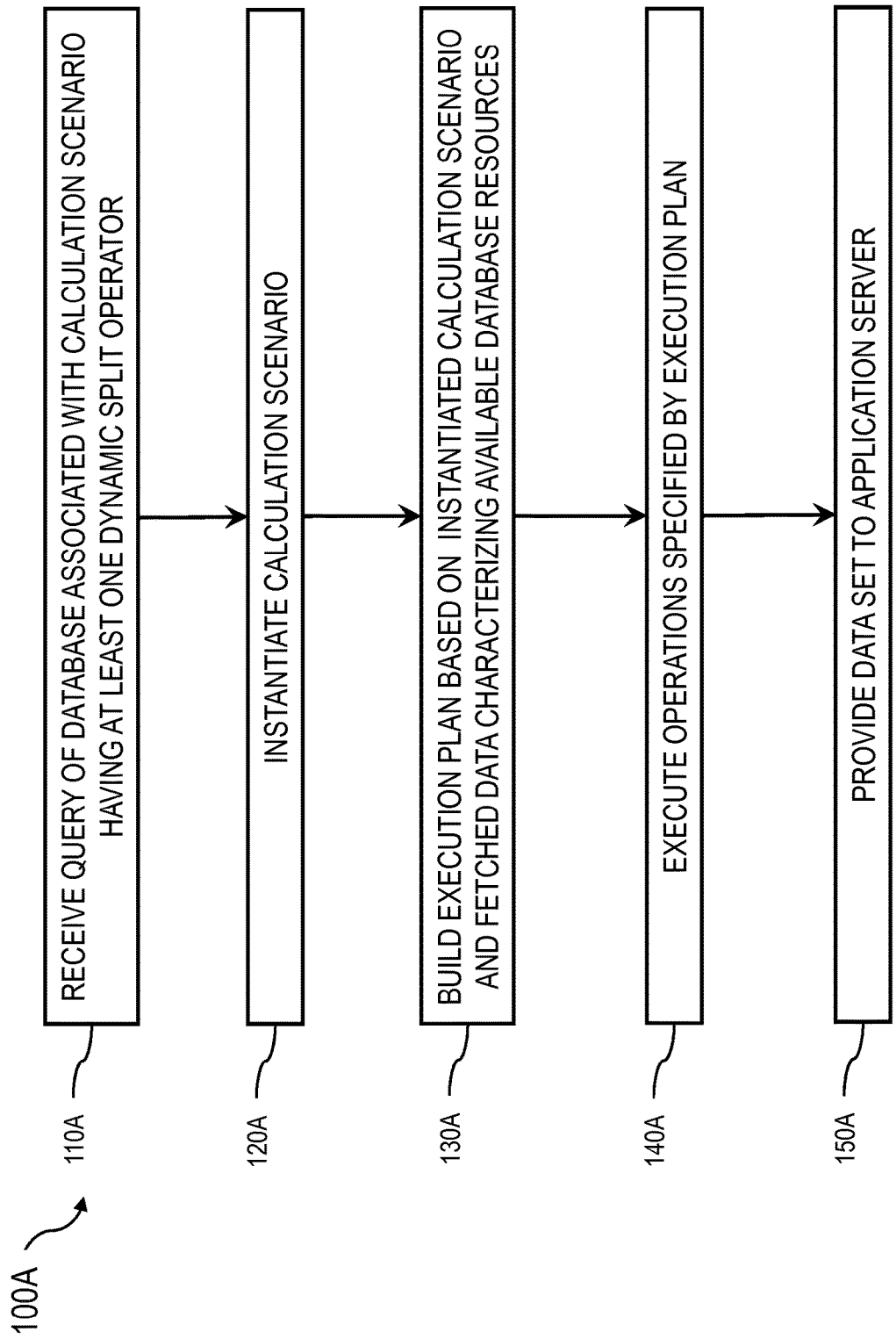
FIG. 1A is a first process flow diagram illustrating a method for implementing dynamic splitting based on available resources.

FIG. 1A is a process flow diagram 100A in which, at 110A a query is received by a database server from a remote application server. The query is associated with a calculation scenario that defines a data flow model that includes one or more calculation nodes that each define one or more operations to execute by a calculation engine on the database server. At least one of the nodes can include a dynamic split operator. The database server then, at 120A, instantiates a runtime model of the calculation scenario. From the runtime model, at 130A, an execution plan is built that specifies how queries will be executed against the database. In addition, data characterizing available database resources (e.g., processor threads, processor cores, available memory, available I/O bandwidth, etc.) is fetched, for example, from a resource manager. As part of the execution plan building, it is determined whether the fetched data triggers criteria for parallelizing one or more operations specified by the dynamic split operator into two or more parallel processor threads (or other split criteria). Subsequently, at 140A, the database server executes the operations defined by the execution plan to result in a responsive data set. The data set can then, at 150A, be provided by the database server to the application server.

Figure 1B:
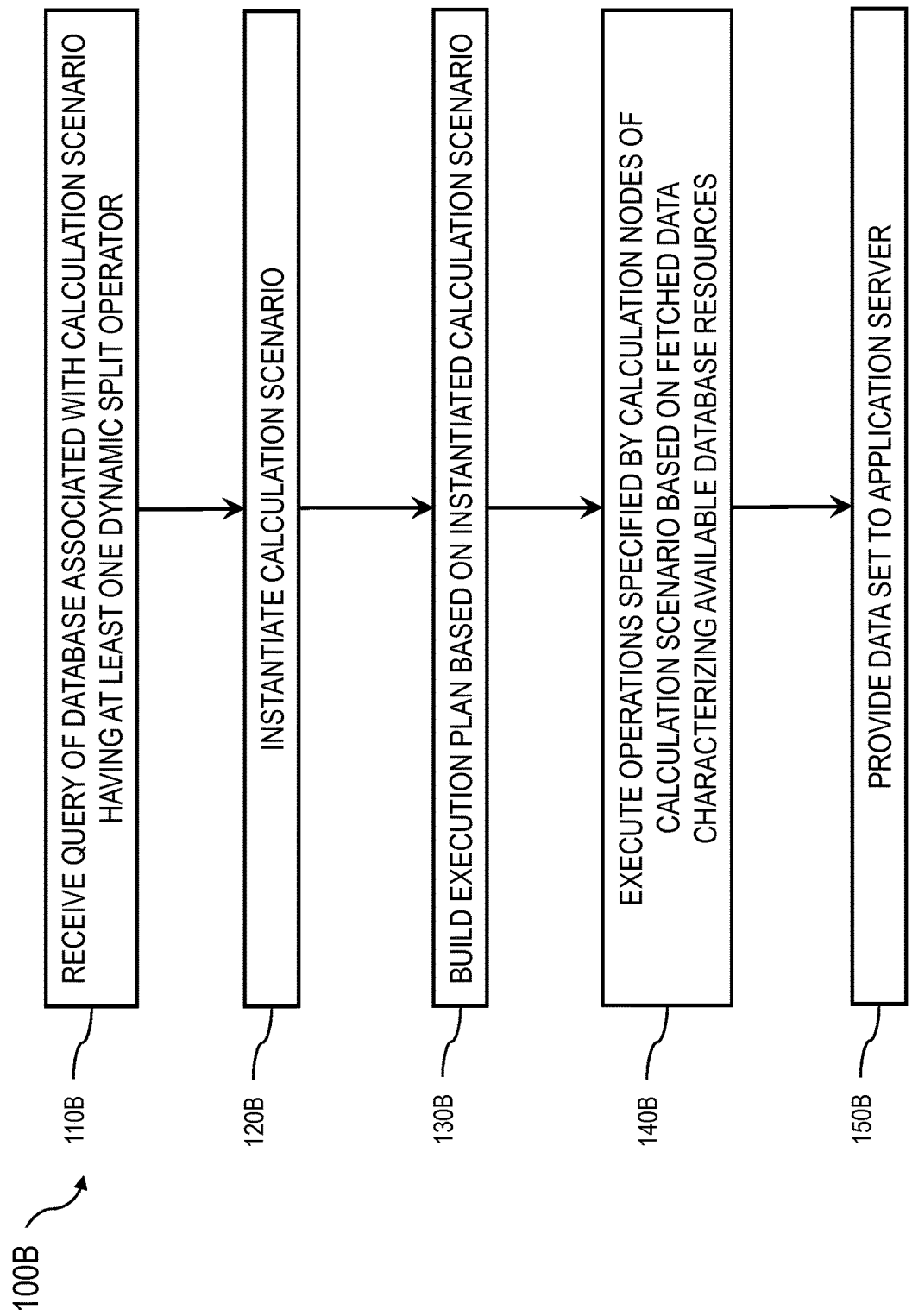
FIG. 1B is a first process flow diagram illustrating a method for implementing dynamic splitting based on available resources.

FIG. 1B is a process flow diagram 100B in which, at 110B a query is received by a database server from a remote application server. The query is associated with a calculation scenario that defines a data flow model that includes one or more calculation nodes that each define one or more operations to execute by a calculation engine on the database server. At least one of the nodes can include a dynamic split operator. The database server then, at 120B, instantiates a runtime model of the calculation scenario. From the runtime model, at 130B, an execution plan is built based on the instantiated calculation scenario that specifies how queries will be executed against the database. Subsequently, at 140B, the database server executes the operations defined by execution plan to result in a responsive data set. During execution, when a dynamic split operator, data characterizing available database resources (e.g., processor threads, processor cores, available memory, available I/O bandwidth, etc.) is fetched, for example, from a resource manager. As part of the execution (as opposed to execution plan building as shown in FIG. 1A), it is determined whether the fetched data triggers criteria for parallelizing one or more operations specified by the dynamic split operator into two or more parallel processor threads. The data set can then, at 150B, be provided by the database server to the application server. With this variation, an execution plan can be cached; however, its execution can change each time based on the available resources.

Figure 2:
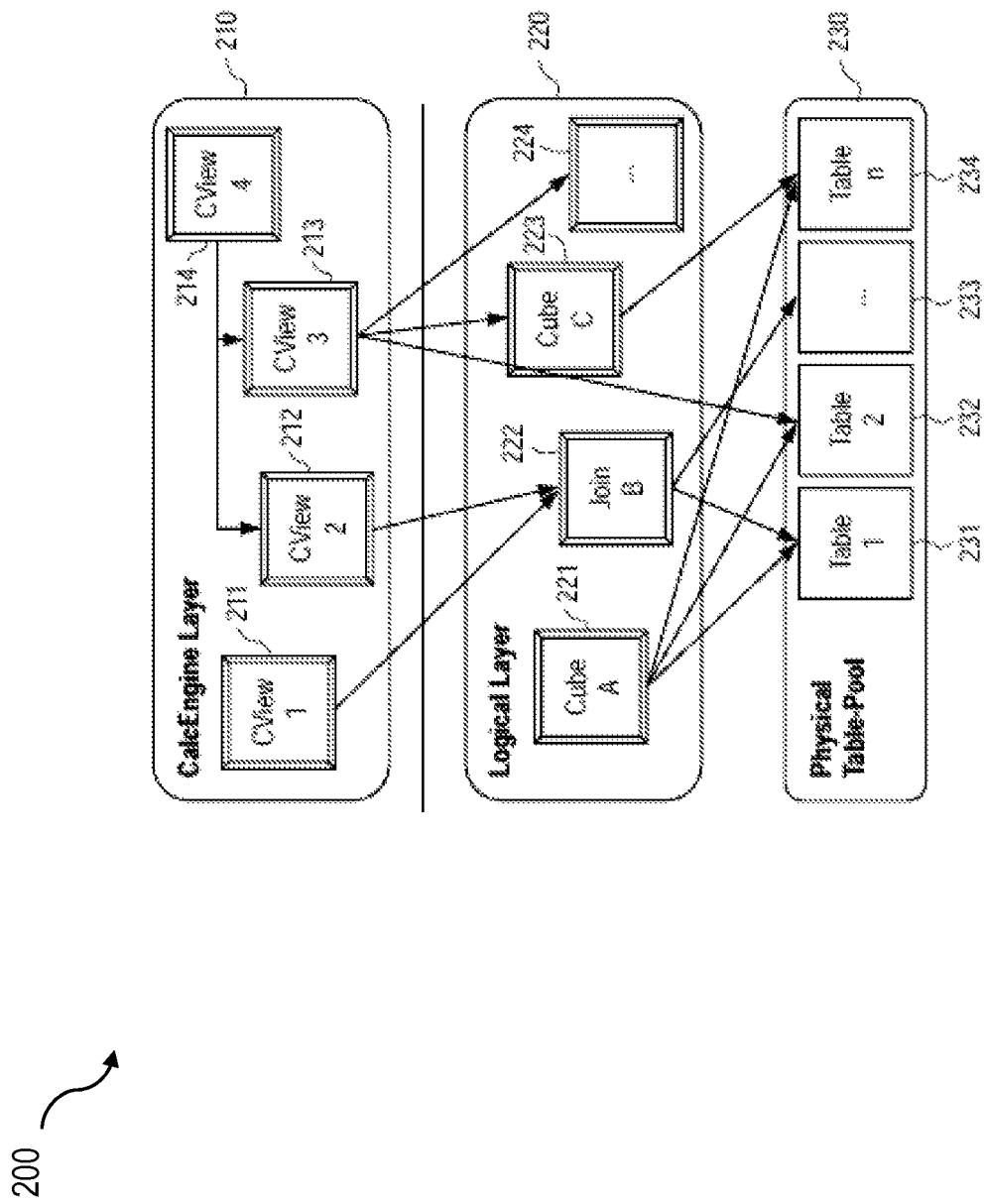
FIG. 2 is a diagram illustrating a calculation engine layer, a logical layer, a physical table pool and their interrelationship.

FIG. 2 is a diagram 200 that illustrates a database system in which there are three layers, a calculation engine layer 210, a logical layer 220, and a physical table-pool 230. Calculation scenarios can be executed by a calculation engine which can form part of a database or which can be part of the calculation engine layer 210 (which is associated with the database). The calculation engine layer 210 can be based on and/or interact with the other two layers, the logical layer 220 and the physical table pool 230. The basis of the physical table pool 230 consists of physical tables (called indexes) containing the data. Various tables can then be joined using logical metamodels defined by the logical layer 220 to form a new index. For example, the tables in a cube (OLAP view) can be assigned roles (e.g., fact or dimension tables) and joined to form a star schema. It is also possible to form join indexes, which can act like database view in environments such as the Fast Search Infrastructure (FSI) by SAP AG.

As stated above, calculation scenarios can include individual calculation nodes 211-214, which in turn each define operations such as joining various physical or logical indexes and other calculation nodes (e.g., CView 4 is a join of CView 2 and CView 3). That is, the input for a calculation node 211-214 can be one or more physical, join, or OLAP views or calculation nodes. A calculation node as used herein represents a operation such as a projection, aggregation, join, union, minus, intersection, dynamic split and the like. Additionally, as described below, in addition to a specified operation, calculation nodes can sometimes be enhanced by filtering and/or sorting criteria. In some implementations, calculated attributes can also be added to calculation nodes.

In calculation scenarios, two different representations can be provided. First, a stored ("pure") calculation scenario in which all possible attributes are given. Second, an instantiated/executed model that contains only the attributes requested in the query (and required for further calculations). Thus, calculation scenarios can be created that can be used for various queries. With such an arrangement, calculation scenarios can be created which can be reused by multiple queries even if such queries do not require every attribute specified by the calculation scenario. For on-the-fly scenarios this means that the same calculation scenario (e.g., in XML format, etc.) can be used for different queries and sent with the actual query. The benefit is that on application server side the XML description of a calculation scenario can be used for several queries and thus not for each possible query one XML has to be stored.

Further details regarding calculation engine architecture and calculation scenarios can be found in U.S. Pat. No. 8,195,643, the contents of which are hereby fully incorporated by reference.

Figure 3:
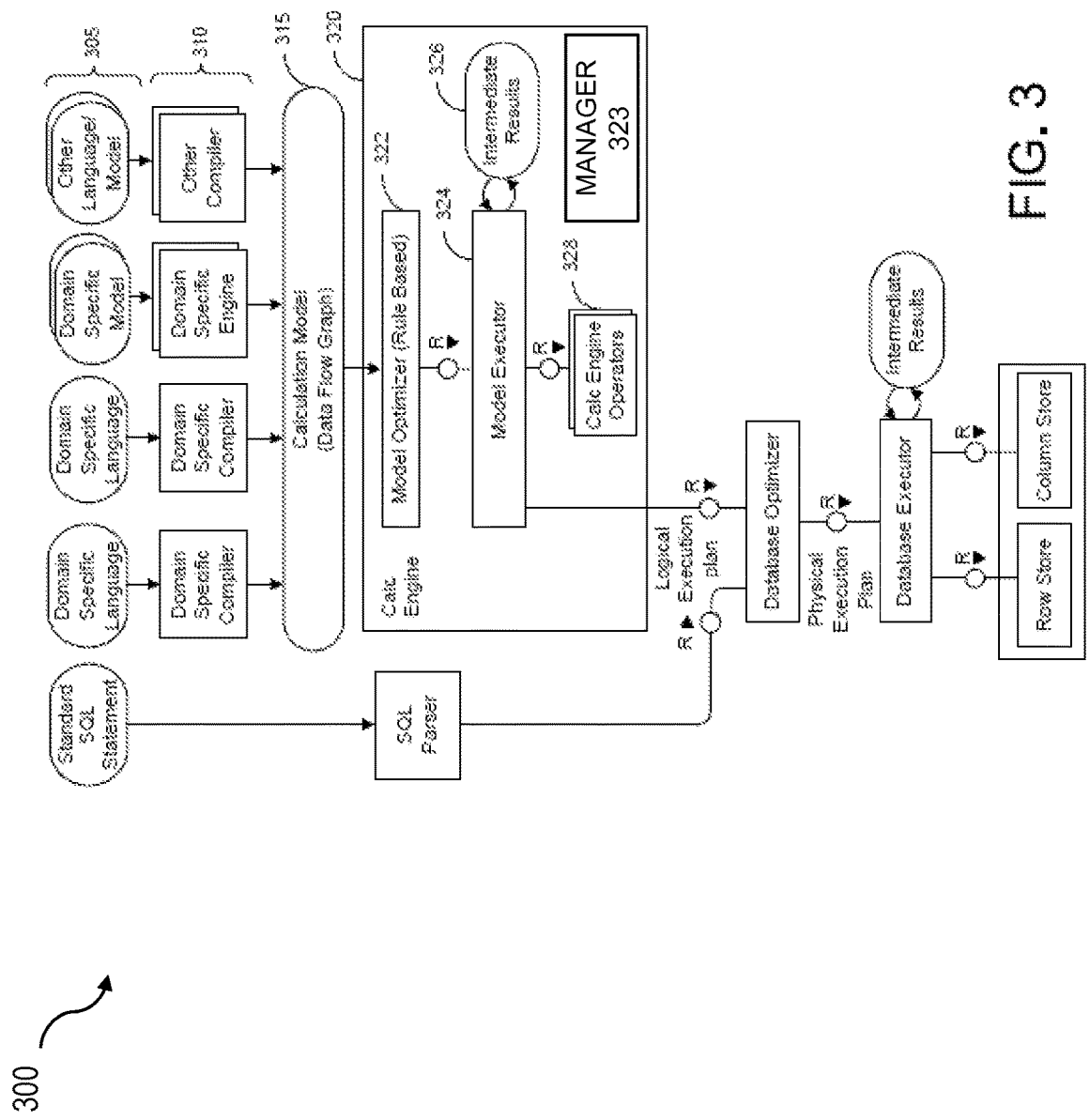
FIG. 3 is a diagram illustrating an architecture for processing and execution control.

FIG. 3 is a diagram 300 illustrating a sample architecture for request processing and execution control. As shown in FIG. 3, artifacts 305 in different domain specific languages can be translated by their specific compilers 310 into a common representation called a "calculation scenario" 315 (illustrated as a calculation model). To achieve enhanced performance, the models and programs written in these languages are executed inside the database server. This arrangement eliminates the need to transfer large amounts of data between the database server and the client application. Once the different artifacts 305 are compiled into this calculation scenario 315, they can be processed and executed in the same manner. The execution of the calculation scenarios 315 is the task of a calculation engine 320.

The calculation scenario 315 can be a directed acyclic graph with arrows representing data flows and nodes that represent operations. Each calculation node has a set of inputs and outputs and an operation that transforms the inputs into the outputs. In addition to their primary operation, each calculation node can also have a filter condition for filtering the result set. The inputs and the outputs of the operations can be table valued parameters (i.e., user-defined table types that are passed into a procedure or function and provide an efficient way to pass multiple rows of data to the application server). Inputs can be connected to tables or to the outputs of other calculation nodes. Calculation scenarios 315 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 315 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result he or she can use a split. Then, the nodes can be automatically multiplied between split and merge and partition the data. Described herein is how the split operator can be enhanced from static split to resource based dynamic split.

Calculation scenarios 315 are more powerful than traditional SQL queries or SQL views for many reasons. One reason is the possibility to define parameterized calculation schemas that are specialized when the actual query is issued. Unlike a SQL view, a calculation scenario 315 does not describe the actual query to be executed. Rather, it describes the structure of the calculation. Further information is supplied when the calculation scenario is executed. This further information can include parameters that represent values (for example in filter conditions). To obtain more flexibility, it is also possible to refine the operations when the model is invoked. For example, at definition time, the calculation scenario 315 may contain an aggregation node containing all attributes. Later, the attributes for grouping can be supplied with the query. This allows having a predefined generic aggregation, with the actual aggregation dimensions supplied at invocation time. The calculation engine 320 can use the actual parameters, attribute list, grouping attributes, and the like supplied with the invocation to instantiate a query specific calculation scenario 315. This instantiated calculation scenario 315 is optimized for the actual query and does not contain attributes, nodes or data flows that are not needed for the specific invocation.

When the calculation engine 320 gets a request to execute a calculation scenario 315, it can first optimize the calculation scenario 315 using a rule based model optimizer 322. Examples for optimizations performed by the model optimizer can include "pushing down" filters and projections so that intermediate results 326 are narrowed down earlier, or the combination of multiple aggregation and join operations into one node. The optimized model can then be executed by a calculation engine model executor 324 (a similar or the same model executor can be used by the database directly in some cases). This includes decisions about parallel execution of operations in the calculation scenario 315. The model executor 324 can invoke the required operators (using, for example, a calculation engine operators module 328) and manage intermediate results. Most of the operators are executed directly in the calculation engine 320 (e.g., creating the union of several intermediate results). The remaining nodes of the calculation scenario 315 (not implemented in the calculation engine 320) can be transformed by the model executor 324 into a set of logical database execution plans. Multiple set operation nodes can be combined into one logical database execution plan if possible.

The model optimizer 322 can be configured to enable dynamic partitioning based on one or more aspects of a query and/or datasets used by queries. The model optimizer can implement a series of rules that are triggered based on attributes of incoming datasets exceeding specified thresholds. Such rules can, for example, apply thresholds each with a corresponding a parallelization factor. For example, if the incoming dataset has 1 million rows then two partitions (e.g., parallel jobs, etc.) can be implemented, or if the incoming dataset has five million rows then five partitions (e.g., parallel jobs, etc.) can be implemented, and the like.

The attributes of the incoming datasets utilized by the rules of model optimizer 322 can additionally or alternatively be based on an estimated and/or actual amount of memory consumed by the dataset, a number of rows and/or columns in the dataset, and the number of cell values for the dataset, and the like.

The calculation engine 320 typically does not behave in a relational manner. The main reason for this is the instantiation process. The instantiation process can transform a stored calculation model 315 to an executed calculation model 315 based on a query on top of a calculation view which is a (catalog) column view referencing one specific node of a stored calculation model 315. Therefore, the instantiation process can combine the query and the stored calculation model and build the executed calculation model.

The main difference between a relational view or SQL with subselects and a calculation model is that the projection list in a relational view is stable also if another SQL statement is stacked on top whereas in a calculation model the projection list of each calculation node in the calculation model is depending on the projection list of the query or the parent calculation node(s).

With a calculation model 315, a user can provide a set of attributes/columns on each calculation node that can be used by the next calculation node or the query. If attributes/columns are projected in a query or on the parent calculation node, then just a subset of these requested attributes/columns can be considered in the executed calculation model.

In some variations, the calculation scenario/calculation model can include one or more dynamic split operators with one or more of several configuration options. For example, the dynamic split operators within a calculation scenario can define a maximum value of parallel threads that is relative to available processing resources (e.g., CPU threads, CPU cores, CPU bandwidth, I/O bandwidth, available memory, etc.) for the computing system or computing systems used by the calculation engine to execute the calculation scenarios/calculation models. The available processing resources can be identified/monitored by from a resource manager 323 within the database. While the resource manager 323 is illustrated as being part of the calculation engine 320, it will be appreciated that the resource manager 323 can form part of other components of the database platform. The maximum value describes the upper bound parallel threads that can be introduced by the dynamic split operator, the lower bound is set to "1" (no split performed) to avoid starvation of the query.

When the execution plan for the query is built by the calculation engine 320, the actual load is fetched from a resource manager 323 within the database which can provide information such as available free CPU threads, available CPU cores, available CPU bandwidth, I/O bandwidth, and available memory. In other variations, the actual load is fetched from the resource manager 323 within the database when the execution plan is being executed. In other variations, the fetched data can be used for both the execution plan building and execution of the execution plan. The number of free threads can be compared to the maximum number of parallel threads (or other resource metrics) that is provided by the modeled dynamic split operator and reduced accordingly if necessary, e.g. numFreeThreads<maxThreads. It will be appreciated that the modeled dynamic split operator can also define splits based on the other types of available resources when applicable.

The number of threads (or other split criteria) for the dynamic split operators can in some variations be determined during building of the execution plan, while in other variations, the number of threads (or other split criteria) can be determined during the execution of the execution plan.

When the execution of the plan comes to the dynamic split operator, the actual load is fetched from the resource manager 323 within the database and the above described mechanisms are applied to determine the degree of parallelism. This in-place dynamic split operator requires execution plan changes during plan execution which is possible within the calculation engine 320 by creating a sub-plan out of the dynamic split operator which includes the splitting, the parallel processing of, for example, custom script operators and a union like merging afterwards.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
   receiving, at runtime, by a database server from a remote application server, a query associated with a calculation scenario defining a data flow model, the data flow model comprising a plurality of calculation nodes defining a plurality operations to be executed at runtime by a calculation engine on the database server, the plurality of calculation nodes comprising a dynamic split operator, the dynamic split operator identifying at least one operation of the plurality of operations as available for parallelizing, the dynamic split operator further comprising a criterion to be evaluated to determine, based at least on an input of the at least one operation, a quantity of partitions for splitting the input, the at least one operation being performed on each partition of the input in parallel, the criterion being evaluated during an execution of an execution plan associated with the plurality of operation instead of during a generation of the execution plan, and the criterion quantifying an amount of available database resources necessary to allow parallelization of the at least one operation without negatively affecting other processes running on the database server;
   instantiating, by the database server, a runtime model of the calculation scenario based on the plurality of calculation nodes;
   generating, at runtime from the runtime model of the calculation scenario, the execution plan specifying how the plurality of operations are to be executed against a database managed by the database server, the runtime model comprising the dynamic split operator;
   executing, by the database server, the execution plan, the execution of the execution plan comprising:
      evaluating the criterion to at least determine, during the execution of the execution plan, the quantity of partitions for splitting the input, the criterion being evaluated based at least on the input to the at least operation; and
      splitting, during the execution of the execution plan, the input into a first partition and a second partition, the splitting being based at least on the quantity of partitions, the first partition and the second partition being operated upon by two or more parallel processor threads comprising the at least one operation; and
   providing, by the database server to the application server, the data set.

2. A method as in claim 1, wherein the fetched data characterizes a number of available processor threads.

3. A method as in claim 1, wherein the fetched data characterizes a number of available processor cores.

4. A method as in claim 1, wherein the fetched data characterizes an amount of available memory.

5. A method as in claim 1, wherein the fetched data characterizes an amount of available I/O bandwidth.

6. A method as in claim 1, wherein at least a portion of paths and/or attributes defined by the calculation scenario are not required to respond to the query, and wherein the instantiated calculation scenario omits the paths and attributes defined by the calculation scenario that are not required to respond to the query.

7. A method as in claim 1, wherein at least one of the calculation nodes filters results obtained from the database server.

8. A method as in claim 1, wherein at least one of the calculation nodes sorts results obtained from the database server.

9. A method as in claim 1, wherein the calculation scenario is instantiated in a calculation engine layer by the calculation engine.

10. A method as in claim 9, wherein the calculation engine layer interacts with a physical table pool and a logical layer, the physical table pool comprising physical tables containing data to be queried, and the logical layer defining a logical metamodel joining at least a portion of the physical tables in the physical table pool.

11. A method as in claim 9, wherein the calculation engine invokes an SQL processor for executing set operations.

12. A method as in claim 1, wherein an input for each calculation node comprises one or more of: a physical index, a join index, an OLAP index, and another calculation node.

13. A method as in claim 1, wherein the executing comprises:
   forwarding the query to a calculation node in the calculation scenario that is identified as a default node if the query does not specify a calculation node at which the query should be executed.

14. A method comprising:
   receiving, at runtime, by a database server from a remote application server, a query associated with a calculation scenario defining a data flow model, the data flow model comprising a plurality of calculation nodes defining a plurality operations to be executed at runtime by a calculation engine on the database server, the plurality of calculation nodes comprising a dynamic split operator, the dynamic split operator identifying at least one operation of the plurality of operations as available for parallelizing, the dynamic split operator further comprising a criterion to be evaluated to determine, based at least on an input of the at least one operation, a quantity of partitions for splitting the input, the at least one operation being performed on each partition of the input in parallel, the criterion being evaluated during an execution of an execution plan associated with the plurality of operation instead of during a generation of the execution plan, and the criterion quantifying an amount of available database resources necessary to allow parallelization of the at least one operation without negatively affecting other processes running on the database server;

instantiating, by the database server, a runtime model of the calculation scenario based on the plurality of calculation nodes;

generating, at runtime from the runtime model of the calculation scenario, the execution plan specifying how the plurality of operations are to be executed against a database managed by the database server, the runtime model comprising the dynamic split operator;

executing, by the database server, the execution plan, the execution of the execution plan comprising:

evaluating the criterion to at least determine, during the execution of the execution plan, the quantity of partitions for splitting the input, the criterion being evaluated based at least on the input to the at least operation; and splitting, during the execution of the execution plan, the input into a first partition and a second partition, the splitting being based at least on the quantity of partitions, the first partition and the second partition being operated upon by two or more parallel processor threads comprising the at least one operation; and providing, by the database server to the application server, the data set.

15. A method as in claim 14, wherein the fetched data characterizes a number of available processor threads.

16. A method as in claim 14, wherein the fetched data characterizes a number of available processor cores.

17. A method as in claim 14, wherein the fetched data characterizes an amount of available memory.

18. A method as in claim 1, wherein the fetched data characterizes an amount of available I/O bandwidth.

19. A method comprising:

receiving, at runtime, by a database server from a remote application server, a query associated with a calculation scenario defining a data flow model, the data flow model comprising a plurality of calculation nodes defining a plurality operations to be executed at runtime by a calculation engine on the database server, the plurality of calculation nodes comprising a dynamic split operator, the dynamic split operator identifying at least one operation of the plurality of operations as available for parallelizing, the dynamic split operator further comprising a criterion to be evaluated to determine, based at least on an input of the at least one operation, a quantity of partitions for splitting the input, the at least one operation being performed on each partition of the input in parallel, the criterion being evaluated during an execution of an execution plan associated with the plurality of operation instead of during a generation of the execution plan, and the criterion quantifying an amount of available database resources necessary to allow parallelization of the at least one operation without negatively affecting other processes running on the database server;

instantiating, by the database server, a runtime model of the calculation scenario based on the plurality of calculation nodes;

generating, at runtime from the runtime model of the calculation scenario, the execution plan specifying how the plurality of operations are to be executed against a database managed by the database server, the runtime model comprising the dynamic split operator;

executing, by the database server, the execution plan, the execution of the execution plan comprising:

evaluating the criterion to at least determine, during the execution of the execution plan, the quantity of partitions for splitting the input, the criterion being evaluated based at least on the input to the at least operation; and splitting, during the execution of the execution plan, the input into a first partition and a second partition, the splitting being based at least on the quantity of partitions, the first partition and the second partition being operated upon by two or more parallel processor threads comprising the at least one operation; and providing, by the database server to the application server, the data set.

20. A method as in claim 19, wherein the fetched data characterizes at least one of: a number of available processor threads, a number of available processor cores, an amount of available memory, or an amount of available I/O bandwidth.

* * * * *